Dec. 20, 1960 H. TIEFENBACH 2,965,729
PRESSURE MEDIUM MONITORING DEVICE
Filed Nov. 14, 1957 2 Sheets-Sheet 1

INVENTOR:
HERMANN TIEFENBACH
By Burgess, Dinklage + Sprung
ATTORNEYS

INVENTOR:
HERMANN TIEFENBACH

United States Patent Office 2,965,729
Patented Dec. 20, 1960

2,965,729

PRESSURE MEDIUM MONITORING DEVICE

Hermann Tiefenbach, Mollneys Nocken 6b, Essen-Kupferdreh, Germany

Filed Nov. 14, 1957, Ser. No. 696,564

Claims priority, application Germany July 25, 1957

2 Claims. (Cl. 200—81.9)

The present invention relates to a method and apparatus for monitoring and observing a discharging liquid or gas which is under pressure, and its purpose is automatically to actuate a signal when either the pressure in the conduit drops or when the discharge at the end of the conduit stops.

Liquids or gases which are under pressure are used for the driving or lubricating of machines in the most varied forms, for instance for hydraulically or pneumatically operated motors and apparatus or for the lubrication of drives. In this connection it is important that the drive or lubricating points be provided with a given minimum quantity of liquid or gaseous substance.

Due to leaks in or clogging of the conduits, it frequently happens, however, that the required minimum quantity no longer discharges at the outlet points as a result of which the machines may be damaged or even destroyed. Monitoring the quantity which discharges at the outlet points is therefore of utmost importance in operation.

Various proposals of the most different type have already been made for the solution of the supervisory problems concerned. From the simplest type of supervision—human observation—which is disadvantageous for many reasons, one has arrived at the most varied types of automatic devices. It has been proposed to install lever systems, actuated by floats, flap valves or the like, in the conduit through which the pressure medium flows, on which systems it acts. Upon a decrease in the pressure these lever systems are moved via mechanical means and actuate signal flaps, electric contacts, or the like, outside the conduit. These devices, however, are complicated in construction, require a large amount of space, and a cumbersome time-consuming assembly, as well as a large amount of servicing in operation; in particular, however, all the known devices are entirely unsuitable to be installed in extremely small conduits; for instance conduits of a diameter of 10 mm., since neither floats nor lever systems can be mounted within such conduits.

The main object of the present invention, therefore, is to provide a device which is suited specifically for such small conduit diameters.

In this connection reference is had to the importance of supervision in the thin conduits, since at the discharge points thin conduits are present in almost all cases. It frequently occurs that in the main conduits of large diameter supervision of the flow of the pressure medium is effected, while at the end of the conduits where the danger of leakage or clogging is the greatest, no monitoring is effected due to the absence of any suitable efflux control.

It has also been proposed to install in a conduit which is to be measured an apparatus which measures the pressure in a so-called bypass. In this connection, however, there is the disadvantage that the conduit can become clogged in the bypass so that the indicating device is placed out of operation.

It has also been proposed to place on the conduit a measuring instrument only a lever arm of which extends through an opening in the pipe into the medium which is to be measured. These devices have on the one hand the same disadvantages as the bypass instruments since the lever arm which extends into the opening represents in a certain sense also a bypass and on the other hand such apparatus are difficult to provide on thin discharge conduits.

In order to counteract all of the abovementioned and known disadvantages of the supervisory devices heretofore employed the instrument of the present invention has been developed. The method of the invention is characterized by the fact that on the end of the feed conduit there is installed an instrument which as a function of the pressure and flow within the conduit and within the medium to be measured produces an electric indication on the outside of the pipe, the instrument having no float or complicated lever construction and being of such simple construction that it can be arranged and installed even in very weak conduits, for instance in conduits of a diameter of 10 mm.

The device in accordance with the invention which is contemplated for the carrying out of the method is characterized by a closed housing which has an inlet opening and an outlet opening and which is so mounted at the end of the conduit that the inlet opening is connected with the conduit end and the outlet opening is at the place of the outlet opening of the conduit. In this connection there is arranged in front of the outlet opening of the housing a swingable switch lever developed in the manner of a bell-crank lever. The one arm is located in front of the outlet opening while the other cooperates with a rocker in or on the housing. This rocker is actuated by the bell-crank lever, connecting electric contacts. The movement of the bell-crank lever and of the rocker takes place when the pressure in the conduit drops or the flow ceases. In this connection it is possible for the switch members proper to be arranged within the pressure medium itself, as a result of which their construction is so small that the insertion of the control device within or at the end of extremely small conduits is possible.

One special embodiment results from the fact that the switch lever is connected with the rocker supported in the housing by means of a pin guided in a bore-hole provided in the housing, which pin rests at one end against the rocker near the latter's end and on the other end against an arm of the switch lever. In this connection it is advisable for the bolt inserted between the rocker and the one arm of the switch lever to be supported within the bore-hole without being attached with one of the two stops.

In accordance with the present invention it is furthermore of particular advantage that there be used as rocker a magnet which is swingably supported about a fixed pivot point and which, in the rest position of the switch lever, is attracted positively into one end position by stops supported in the housing and responding to magnetic lines of force. In this way the entire switch system is considerably simplified since the magnetic lines of force produce one of the two switch positions with practically no mechanical momentum. In this connection it may be advisable to use simple iron screws which connect the individual switch members of the electric contacts as metallic stops for the magnetic rocker. It is also advantageous for at least one part, and preferably the entire housing, to be made of a transparent material, for instance Plexiglas.

In this way the entire switch mechanism can be viewed at any time in an extremely simple manner to make certain that it is operating dependably.

It is also advantageous for the lever cooperating with the switch members and fastened to the rocker to be so developed that it surrounds the switch member or members and returns them positively into their initial position after each actuation.

In accordance with the invention it is furthermore of advantage for the electric contacts and the rocker to be arranged on the cover which can be screwed into the housing or otherwise fastened to it. In this way there is obtained the essential advantage that the entire switch system can be rapidly and dependably replaced and repaired without any substantial disturbance in operation.

It may be of particular value in accordance with the invention for the rocker to be actuated magnetically in the manner for instance that the arm, cooperating with the rocker, of the switch lever which is in communication with the pressure medium is provided with a magnet or is itself developed as a magnet in such a manner that upon being brought to the housing wall it so influences the magnetic rocker, supported in the housing, by the magnetic lines of force which pass through the housing wall that the rocker actuates the corresponding electric contacts either by repulsion in the case of the same poles or attraction in the case of opposite poles. This has the advantage that the housing can be completely closed and intermediate parts connecting with the rocker and the switch lever can be dispensed with. The switching is thus effected practically without contact, which substantially reduces the natural wear of the individual parts and furthermore makes the apparatus suitable also for the monitoring of gases. In this connection it is advantageous that the rest position of the rocker in case of a decrease in pressure or flow within the conduit, is reached via a counteracting force, for instance a second magnet which is arranged on the arm of the switch lever in contact with the pressure medium or by a spring. The arm of the switch lever which cooperates with the pressure medium can also be developed as a magnet in which connection the magnet acting in front of the flow opening can form a differential with the inner magnet. This embodiment has the advantage that bushings in the housing wall are avoided.

The arm of the switch lever which is actuated by the pressure medium may advantageously be imparted a special shape, for instance the shape of a spoon.

The switch lever can also be so developed that it is supported entirely within the housing. In this connection it is advantageous that it be pressed within the preferably tubular housing in the direct region of the flowing medium against a contact ball mounted firmly on the housing whereby a corresponding signal circuit is closed. The switch members are thus no longer exposed to any external influences. The dependability in operation is thereby increased, and the installation in very small conduits is further facilitated without any substantial effect on the conduit cross-section. In the same way it appears advisable that there is fastened in the housing, transverse to the discharge direction, an axis on which the moving contact spring with ball contact is arranged, the contact spring being connected with a leaf spring acting in the opposite direction and which can be set by an eccentric cam which is adjustable from outside the housing. The outer setting screw for the eccentric cam can be provided with markings on which the pressures are indicated. In the case of larger conduits a plurality of contact springs which are permanently set to different pressures can be arranged within the liquid.

The main advantages of the present invention thus consist in creating a device which can be installed, sensitive to pressure and liquid, in very small conduits, the construction being so simple that disturbances in operation are extensively avoided and furthermore the space required being so slight that the cross-section of the pipe is only very slightly decreased as soon as the installation has been effected.

The invention will be explained in further detail on basis of a drawing which shows a few embodiments.

Figure 1:
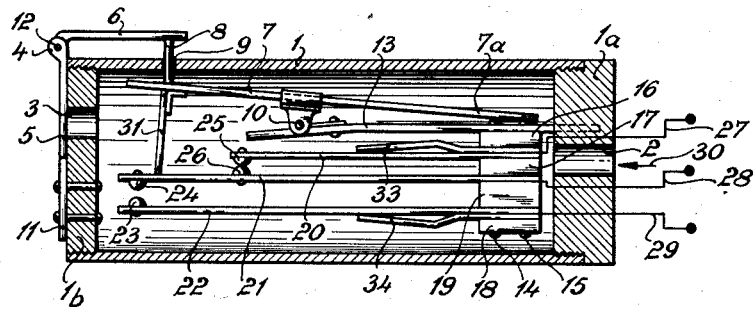
Figure 1 is a longitudinal section through a device developed in accordance with the invention.

As shown in Figure 1, the housing consists essentially of a pipe length 1 which is closed at the two ends by two closure inserts, 1a and 1b. These closure members 1a and 1b can, for instance, be screwed in the pipe length 1 or fastened thereto in some other manner and are provided with flow openings 2 and 3 to which the corresponding conduit ends (not shown in further detail) extending to the pressure or lubricating points to be monitored, are connected. In front of the through-flow opening 3 which serves as outlet there is supported for instance, on a corresponding support 11 fastened in the closure piece 1b at point 12 a switch lever 4 developed as bell-crank lever, one arm 5 of which lies in front of the flow opening 3 in the position indicated in Figure 1, while the other arm 6 cooperates with a pin 8 which is guided in a bore 9 of the pipe length 1 and cooperates in the one end region with a rocker 7 swingably supported in the housing at point 10. This rocker 7 is preferably developed as a magnet or at least provided with magnets in one of the two end regions. As support for the rocker 7 there is employed for instance a plate 13 of non-ferrous metal fastened in the closure member 1a or of similar construction. At this plate 13 there are seated, connected by screws 14 and 15, insulating insertions 16, 17, 18, and 19 between which the different contacts with springs 20, 21, and 22 with the contact balls 23, 24, 25, and 26, and the supporting springs 33 and 34 are supported.

The control process proper takes place as follows:

In accordance with Figure 1, no pressure or lubricant would flow through the apparatus, i.e. the switch lever 4 is in rest position and its arm 5 lies in front of the flow opening 3. The contact balls 25 and 26 are thus connected so that a circuit is closed via the conduits 27 and 28 which connects the alarm signal (not further shown) or possibly via known additional connections automatically stops the machine unit supplied with the pressure or lubricating medium. In this position the second contact, formed by the contact balls 23 and 24, is open so that the circuit passing over the conduits 28 and 29 is open. This circuit serves to monitor the first circuit and in closed state shows that the rocker 7 is dependably connected.

Figure 2:
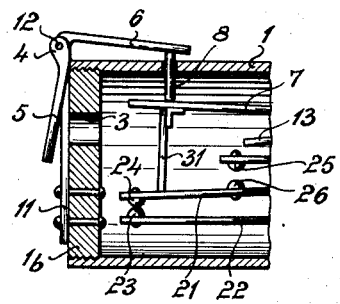
Figure 2 shows said device in partial section, the switch lever being in its other end position.

If a pressure medium, lubricant or the like, now flows through the flow opening 2 in the direction indicated by the arrow 30 into the pipe length 1 and leaves it again through the flow opening 3, said pressure medium presses the arm 5 of the switch lever 4 away from the opening 3 into the position indicated in Figure 2. The switch lever 4 swings about its pivot point 12 and forces the rocker 7 down via the arm 6 and pin 8. To the rocker 7 there is now fastened in any desired arrangement a lever 31 which forces the switch spring 21 down and thereby on the one hand opens the circuit closed by the contact balls 25 and 26 and closes the circuit opened by the contact balls 23 and 24. In this way it is indicated that the required pressure is present in the corresponding conduits or that the quantity of pressure medium required for dependability in operation is conducted through the pipe length. If the pressure within the conduit and thus also necessarily within the pipe length 1 drops below a set value or if the flow stops for any reason, the position indicated in Figure 1 is positively reestablished. The moving back of the rocker 7 can be achieved or supported in the manner that it is developed as a magnet, the attraction taking place for instance by steel screws 14 and 15.

Figure 3:
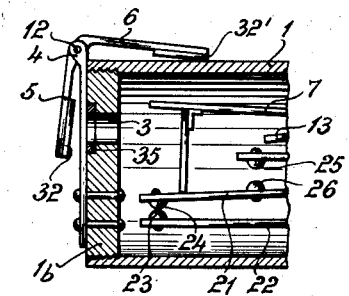
Figure 3 shows a magnetic development of the switch lever.

The arm 5 may also be developed in the form of a spoon. No particular showing of this has been given in the drawing since the drawing represents merely the principle of the invention. In order to avoid any hole in the housing proper, the switch lever 4, as shown in Figure 3, can also be developed with magnets 32 and 32' arranged on both arms 5 and 6 or the arms 5 and 6 can themselves be magnets. If thus for instance the magnet 32' is moved by the action of pressure on the arm 5 against the pipe length 1, it forces the magnets of the rocker 7 away and opens the circuit closed by the contact balls 25 and 26 simultaneously closing the circuit which until then was opened by the contact balls 23 and 24. In this way the overall device is also ready for use for the control of gaseous pressure media. If in this embodiment the pressure drops within the conduit, the magnet 32 seated on the arm 5 of switch lever 4 is attracted by an iron or steel ring 35 arranged for instance within the flow opening 3 so that the arm 5 swings back, as a result of which the rocker 7 again moves into its position shown in Figure 1.

In order to avoid the consequences of wear of the individual contact switch members, the lever 31 fastened on the rocker as well as the supporting strings 33 and 34 can be so developed that said lever—as is not however shown in the drawing—surrounds the contact switch members 21 and 22 and positively pulls them also back into their initial position.

Another particularly advantageous embodiment results from supporting the switch lever 4 within the pipe length 1 so that there are no longer any switch parts outside the housing. In this connection the switch lever may also be fastened directly to the rocker without thereby going beyond the scope of the present invention. These embodiments which are not shown in detail for the sake of simplicity have the advantage that a simple, perfectly sealed closure with respect to the conduits conducting the pressure medium or the lubricant is obtained. In case of special requirement it is also possible for the entire housing to be subdivided into two chambers, the entire switch members being supported in the one part of the housing and having no direct connection with the other part which is traversed by the pressure medium or the lubricant.

Figure 4:
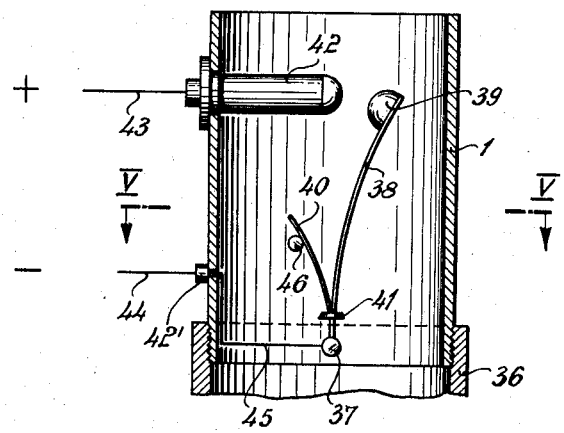
Figures 4 and 5 are a longitudinal section, and a cross-section respectively through a particularly simple control device.
Figure 5:
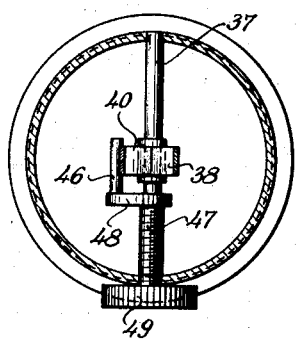

In the preferred embodiment of Figs. 4 and 5, the monitoring device comprises a tubular housing 1 which has one end thereof secured in the pressure medium conduit 36 proper, for instance by a thread. In the tubular housing 1 there is a switch comprising contacts 42 and 39. This switch is part of an electrical circuit which includes an indicating means (not shown) arranged for response to the switch.

In the tubular housing 1 there is supported a shaft or axis 37 on which the leaf spring contact arm or contact spring 38 proper with the contact 39 is turnably arranged. The contact spring 38 has a further spring yoke 40 which is oppositely directed and is fastened in a permanent manner by means of a small rivet 41 to the contact spring 38. Fixed contacts 42 and 42' are arranged in the housing 1. While contact 42 is connected for instance with the positive line 43 contact 42' is connected with the negative line 44 which is connected via a suitable intermediate line 45 or via the ground with a contact spring 38. The contact spring 38 lies in the region proper of the pressure medium to be measured which presses the contact lever against the contact 42 arranged in the housing as long as pressure and flow are present whereby the circuit is closed and any desired optical and/or acoustic signal (not shown) is placed in operation. This embodiment accordingly also contains a closed circuit control connection. In order to be able to use the device for different pressures, there is provided biasing means for adjusting the switch and thereby selecting the material flow rate effective to actuate the switch, and there is also provided linkage means for adjusting the position of the biasing means from without the housing 1. In the biasing means, the spring yoke 40 cooperates with a cam 46 which opposes movement of the contact arm in response to material flow and which is seated on an eccentric disc 48 connected with screw 47. By rotation of the actuating wheel 49 the cam is swung further by a corresponding amount and presses the contact spring 38 away from the stationary contact by a larger or smaller distance whereby a greater or smaller pressure is necessary in order to close the circuit. The actuating wheel can be provided with markings for the corresponding pressures (not shown in the drawing), while a corresponding setting mark is provided on the housing.

Of course it would also be possible to develop the contact spring in such a manner that it closes the circuit when the conduit is without pressure and the corresponding conduit pressure effects an opening of the circuit, whereby the corresponding signals can also be actuated. This embodiment, which represents an open circuit system has not been shown in the drawing but is to be considered to fall under the present patent protection. Likewise it would be possible to have the contact spring 38 cooperate directly with the setting pin 46 by suitably shaping it.

I claim:

1. A monitoring device suitable for monitoring fluid flow and comprising a tubular housing having an inlet end and an outlet end, whereby fluid can be flowed therethrough, an electrical switch means disposed within the housing in the direct path of flow of fluid in normally open condition, said switch means being adapted to be maintained in closed contact by the pressure of the fluid normally flowing through said housing, said switch means including two contacts, one of said contacts being mounted on a leaf spring contact arm which is arranged for response to fluid flow through the housing and effecting actuating of the switch means depending on fluid flow through the housing, opposing means for opposing movement of the contact arm in response to fluid flow, and biasing means for selectively adjusting the opposing means and thereby selecting the fluid flow rate effective to actuate the switch means, said leaf spring contact arm being turnably mounted on a shaft extending transversely of the housing, said opposing means comprising a cam arranged to oppose the travel of the spring contact arm, said biasing means comprising an eccentric mounting for the cam and means for adjusting the position of the cam.

2. A monitoring device according to claim 1, said eccentric mounting including linkage means for adjusting the position of the cam from without the housing.

References Cited in the file of this patent

UNITED STATES PATENTS

| | | |
|---|---|---|
| 410,270 | Donner | Sept. 3, 1889 |
| 993,460 | Rice | May 30, 1911 |
| 1,936,356 | Free | Nov. 21, 1933 |
| 2,038,111 | Hopkins | Apr. 21, 1936 |
| 2,526,315 | Allen et al. | Oct. 17, 1950 |
| 2,740,858 | Euler | Apr. 3, 1956 |
| 2,789,175 | Mahr | Apr. 16, 1957 |
| 2,824,186 | Binford | Feb. 18, 1958 |
| 2,907,015 | Young | Sept. 29, 1959 |